United States Patent [19]

Garg et al.

[11] Patent Number: 4,648,977

[45] Date of Patent: Mar. 10, 1987

[54] PROCESS FOR REMOVING TOXIC ORGANIC MATERIALS FROM WEAK AQUEOUS SOLUTIONS THEREOF

[75] Inventors: Desh R. Garg, Hopewell Junction; James S. Ritscher, Ossining, both of N.Y.

[73] Assignee: Union Carbide Corporation, Danbury, Conn.

[21] Appl. No.: 814,897

[22] Filed: Dec. 30, 1985

[51] Int. Cl.$^4$ .............................................. C02F 1/28
[52] U.S. Cl. .................................... 210/673; 210/691
[58] Field of Search ................................ 210/673, 691

[56] References Cited

U.S. PATENT DOCUMENTS 2,966,451 12/1960 Caesar et al. ..................... 210/673
3,732,326 5/1973 Chen ................................. 210/691
4,257,885 3/1981 Grose et al. ...................... 210/691
4,335,020 6/1982 Chu et al. ...................... 252/455 X Primary Examiner—Ivars Cintins
Attorney, Agent, or Firm—Richard G. Miller

[57] ABSTRACT

Toxic or otherwise contaminating organic impurity constituents in aqueous media such as waste water streams from industrial processes or potable water supplies are removed and converted to harmless oxidation products by contacting such media with an organophilic molecular sieve whereby the organic species are concentrated as adsorbates, and thereafter contacting the adsorbate-loaded molecular sieve with an aqueous solution of a compound which has a standard oxidation potential of at least 0.25 volt in an amount and for a sufficient time to convert the organic materials to non-toxic products such as $CO_2$.

8 Claims, 1 Drawing Figure

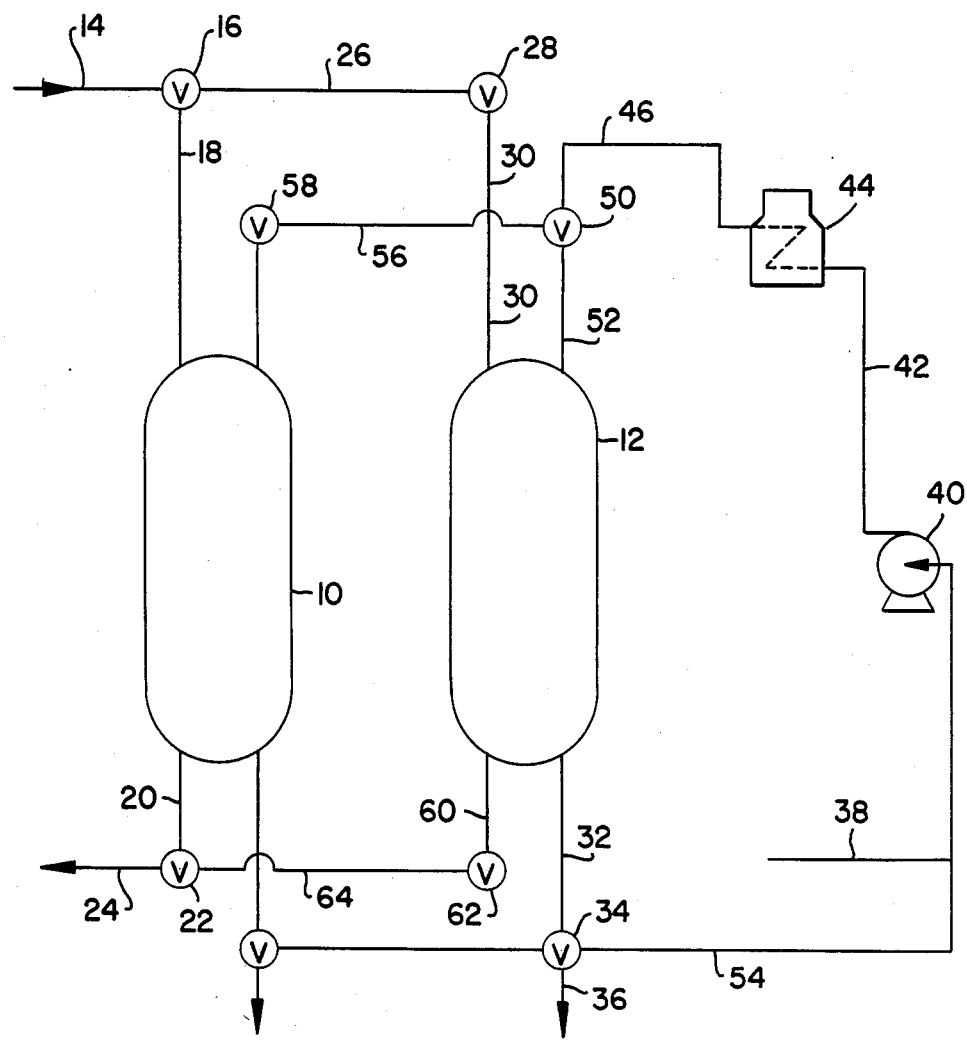

PROCESS FOR REMOVING TOXIC ORGANIC MATERIALS FROM WEAK AQUEOUS SOLUTIONS THEREOF

BACKGROUND OF THE INVENTION

Field of the Invention

This invention is concerned in general with the removal of organic impurities from aqueous media such as potable water supplies using molecular sieve adsorbents. More particularly, the invention involves the treatment of aqueous media to remove organic contaminants present in relatively low concentrations, i.e., from about 10 parts per billion by weight (ppb) up to about 20,000 parts per million by weight (ppm), by selective adsorption thereof on an organophilic molecular sieve and the subsequent partial or complete oxidation of the adsorbed organic species by contact with a solution of a strong oxidizing agent.

Discussion of the Prior Art

The contamination of supplies of potable water is a major public health concern throughout the world. Sources of ground water contamination are many and varied and include land fills, agricultural pesticides, leakage from stored gasoline, septic tanks, mining operations, petroleum and natural gas production and improperly constructed and maintained industrial toxic waste dumps. The discharge of chlorinated organics into the environment, is a cause of particular concern because of the known or suspected carcinogenic or mutagenic properties of some of these materials and the difficulty with which they are biologically digraded. In many instances chlorinated and other halogenated organic compounds pass through conventional industrial or municipal wastewater treatment plants essentially unaltered.

Several techniques have heretofore been proposed to detoxify or treat contaminated water, principal among which are the so-called air stripping procedure and the method involving the adsorption of the organic values on granulated activated carbon (GAC adsorption). The air stripping process involves stripping the volatile organics from water by contacting the contaminated water with air, most commonly in a countercurrent manner in a packed tower. Contaminated water is introduced at the top of the tower and as it flows down the tower, the volatile organics are stripped off by air that is flowing upwards following introduction at the bottom of the tower. The treated "clean" water is withdrawn at the bottom. A serious disadvantage with this technique is that the air, that is now contaminated with stripped off organics, is discharged into the atmosphere from the top of the tower. The organic pollutants are thus merely transferred from water to air. The technique, therefore, does not get rid of the undesirable pollutants. Other disadvantages to the method are the inability to deal with non-volatile contaminents such as certain pesticides, and the tendency for the stripping tower to be affected by biological growth.

GAC adsorption processes are capable of removing both volatile and non-volatile contaminants from aqueous media, but require expensive high carbon usage to obtain a purified water having non-detectable levels of impurity. Also the adsorption system is cumbersome to regenerate and, in any event, causes a secondary pollution problem in the disposal of the adsorbed impurities. A combination of both types, i.e. the air-stripping and the GAC adsorption process is disclosed in U.S. Pat. No. 4,544,488 issued Oct. 1, 1985 to R. P. O'Brien. Other processes are disclosed in U.S. Pat. No. 4,526,692 issued July 2, 1985 to T. L. Yohe and U.S. Pat. No. 4,517,094 issued May 14, 1985 to G. W. Beall. It is also well known to disinfect or sanitize aqueous media such as recirculating water systems, effluents from food processing industries, paper mills, sewage stations and the like by the introduction of very strong oxidizing agents such as ozone. In this regard see U.S. Pat. No. 4,541,944 issued Sept. 17, 1985 to Sanderson.

SUMMARY OF THE INVENTION

It has now been discovered that aqueous media containing from about 10 ppb to 20,000 ppm by weight of organic impurities can be purified by an adsorptive process which entails no secondary pollution problem in disposing of the scavenged organic impurities. In accordance with the present invention, the process comprises providing a liquid water feedstock containing from about 10 ppb to 20,000 ppm by weight of dissolved organic materials, contacting said feedstock with an adsorptive mass consisting essentially of a zeolitic molecular sieve having a framework molar $SiO_2/Al_2O_3$ ratio of at least 12, said molecular sieve having pore diameters large enough to adsorb at least some, and preferably all, of the said organic materials, the duration of said contact being adequate under the conditions imposed to permit the selective adsorption of at least some of the organic impurity, removing the bulk of purified water from contact with the molecular sieve adsorbent containing the adsorbed organic impurity and simultaneously regenerating said molecular sieve and oxidatively destroying at least a portion of the organic adsorbate by contact with a solution containing a soluble compound which as a standard oxidation potential of at least 0.25 volt. Thereafter the thus regenerated molecular sieve is contacted with additional water feedstock for further adsorptive purification.

DETAILED DESCRIPTION OF THE INVENTION

The liquid water feedstocks suitably treated by the process of this invention are not critical as to their source. Ground water, industrial waste water streams, effluents from municipal sewage treatment facilities and the like are all suitable feedstocks provided they contain as a solute at least about 10 ppb of organic impurities. It is not a critical factor whether the impurities are considered to be volatile or non-volatile. The organic contaminants most frequently found in well water include chloro-organics such as tetrachloroethylene, trichloroethylene, 1,1,1-trichloroethane, carbon tetrachloride, chloroform, monochlorobenzene, dichlorobenzene, methylene chloride, benzene, toluene, xylenes, ethyl benzene, chlorodibromomethane, and dibromochloropropane, and can include organic cyanides, mercaptans and certain naturally occurring organics commonly referred to as "humics". Of course, in any particular location the water feedstock may contain any organic molecular species since essentially any organic material existing in nature or synthesized by man can ultimately find its way into the environment and hence into a water source.

It is important to the operability of the present process that the zeolitic molecular sieve adsorbent utilized has an adsorptive preference for the less polar organic materials with respect to water. As a general rule the more siliceous the zeolite, the stronger the preference for non-polar adsorbate species. Such preference is usually observable when the framework molar SiO$_2$/Al$_2$O$_3$ ratio is at least 12, and is clearly evident in those zeolite species having SiO$_2$/Al$_2$O$_3$ ratios of greater than 50. A wide variety of zeolites can now be directly synthesized to have SiO$_2$/Al$_2$O$_3$ ratios greater than 50, and still others which cannot at present be directly synthesized at these high ratios can be subjected to dealumination techniques which result in organophilic zeolite products. High temperature steaming procedures involving zeolite Y which result in hydrophobic product forms are reported by P. K. Maher et al., "Molecular Sieve Zeolites," Advan. Chem. Ser., 101, American Chemical Society, Washington, D.C., 1971, p. 266. A more recently reported procedure applicable to zeolite species generally involves, dealumination and the substitution of silicon into the dealuminated lattice site. This process is disclosed in U.S. Pat. No. 4,503,023 issued Mar. 5, 1985 to Skeels et al. Many of the synthetic zeolites prepared using organic templating agents are readily prepared in a highly siliceous form—some even from reaction mixtures which have no intentionally added aluminum. These zeolites are markedly organophilic and include ZSM-5 (U.S. Pat. No. 3,702,886); ZSM-11 (U.S. Pat. No. 3,709,979); ZSM-12 (U.S. Pat. No. 3,832,449) and ZSM-35 (U.S. Pat. No. 4,016,245) to name only a few. It has been found that the silica polymorphs known as silicalite, F-silicalite and TEA-Silicate are particularly suitable for use in the present invention and are thus preferred. Though not, strictly speaking, zeolites, because of a lack of ion-exchange capacity, these molecular sieve materials are included within the terms zeolite or zeolitic molecular sieve as used herein. These materials are disclosed in U.S. Pat. Nos. 4,061,724; 4,073,865 and 4,104,294, respecitively. Not only are high-silica zeolites organophilic, but is has also been found that they are resistant towards crystal lattice degradation from contact with the strongly oxidizing compounds used to oxidatively degrade the organic impurities in the second (or regenerative) stage of the present process. Such a lack of resistance toward oxidation makes activated carbon adsorbent generally unfit for use in this process.

It has also been observed that the high-silica zeolite adsorbents used in the present process not only concentrate the organic impurities and thus facilitate efficient oxidation thereof, but that they appear to exhibit a catalytic activity in promoting the reaction between the organic substrates and the oxidizing compound. Without wishing to be bound by any particular theory, it is likely that trace metal impurities in the zeolite crystals are responsible at least in part for the observed phenomenon. Accordingly it is contemplated that zeolites which have been enhanced in catalytic metal content without undue sacrifice to hydrophobicity are preferred adsorbents for this invention. The techniques for introducing catalytic metals, such as the Group VIII noble metals and the Group VIII non-noble metals, into or onto the zeolite base are well-known in the art, and include the ion-exchange and impregnation techniques employed universally in the catalyst art.

The oxidizing agents used to regenerate the adsorbent have a standard oxidation potential of at least 0.25 volt, and preferably between 0.5 and 2.0 volts. Illustrative of compounds which have such oxidation potentials are the chlorates (ClO$_3^-$), the hypochlorites (OCl$^-$), the permanganates (MnO$_4^-$), the dichromates (Cr$_2$O$_7^{-2}$) and hydrogen peroxide (H$_2$O$_2$). These compounds have the following respective standard oxidation potentials: 0.63 volt, 0.89 volt, 1.23 volts, 1.33 volts and 1.77 volts. Compounds having an oxidation potential greater than 2.00 volts include the peroxy-sulfates and ozone. While very effective in oxidizing the organic substrates, the compounds with oxidation potentials greater than about 2.0 tend to cause some deterioration of the zeolite crystal structure. The above-mentioned compounds can contain various cations in association with the specified anions. For instance, the compounds can be in the forms of metal salts, such as the alkali metal salts, or even ammonium salts. The sole criterion being that the oxidation potential of the compound be at least 0.25 volt. As utilized to contact the organic-loaded zeolite adsorbent, the oxidizing compounds are most commonly in the form of aqueous solutions.

The concentration of the oxidation compound in the solution is not narrowly critical. Of course, if extremely dilute solutions of the oxidation agent are employed, protracted contact times may be required. On the other hand, highly concentrated solutions require relatively brief contact times. In general the concentration of the oxidizing compound can range from about 1% to about 90% (wt.), preferably 10% to 50%, although preferred concentration ranges vary among the suitable oxidizing agents. The preferred oxidizing agent is H$_2$O$_2$, which can be used as the pure compound, i.e. 100%, but for safety considerations, lower concentrations in aqueous solution in range of about 20 to 40 weight percent are recommended.

The contact time of the oxidizing agent and the organic-loaded zeolite will depend upon the particular oxidizing compound employed, its concentration, the temperature of contact and the degree of oxidation of the organic substrate desired. Contact periods between 0.5 hours and 72 hours are typical. The temperature can vary from about 0° C., to 94° C., but is not a critical factor.

In carrying out the process the adsorption and regeneration procedures are typically accomplished by passing the feedstock to be treated and the oxidizing regenerate through a packed or fixed bed of the adsorbent. The process can, however, be carried out in a number of other arrangements common to the adsorption and water treatment art. For example, the adsorbent can be slurried in the water to be detoxified, removed therefrom by filtration, decantation, centrifugation or the like and regenerated by again being slurried in the oxidizing solution. For continuous operation, a treatment system involving at least two fixed beds of zeolite adsorbent is advantageously employed so that regeneration of spent beds can be conducted while other fresh beds are engaged in the adsorption-purification stage.

THE DRAWINGS

In the drawings the single FIGURE is a schematic flow diagram illustrating one embodiment of the present invention.

With reference to the FIGURE of the drawings, the present process is illustrated as involving the following procedure: Adsorption beds 10 and 12 are packed with silica bounded 1/16 inch diameter extruded silicalite particles. Feedstock water containing 200 ppm organic impurities is passed into the system through line 14, valve 16 and line 18 into the top of bed 10. During passage through bed 10 the organic content of the feedstock is selectively adsorbed on the silicalite, with the organic mass transfer zone passing downward and purified water leaving the bed through line 20, valve 22 and line 24. The adsorption is continued until just prior to break through of the organic mass transfer zone, and the feedstock is then diverted to bed 12 through valve 16, line 26, valve 28 and line 30. Bed 12 has, during the period bed 10 was on adsorption, been regenerated after a previous adsorption stage therein by the following procedure: After the flow of feedstock through line 30 has been terminated, bed 12 is drained through line 32, valve 34 and line 36, and thereafter an aqueous solution of oxidizing compound, which is introduced into the system through line 38 is circulated by means of pump 40 through line 42, heater 44, line 46, valve 50 and line 52 downward through bed 12, line 32, valve 34 and line 54. The circulation of oxidizing solution can be interrupted, if desired, for a period of quiescent contact of the oxidizing solution with the adsorbent in bed 12. After the desired degree of oxidation of the organic substrate, the bed is drained through line 32, valve 34 and line 36, and optionally is flushed with a diverted portion of the feedstock through valve 16, line 26, valve 28 and line 30. Thereafter the purification stage in bed 10 is terminated and regeneration therein is begun by passing oxidizing solution through valve 50, line 56 and valve 58, and feedstock water is fed into bed 12 through line 14, valve 16, line 26, valve 28 and line 30. Purified water is removed from the system through line 60, valve 62, line 64 valve 22 and line 24.

The invention is further illustrated by the following examples:

EXAMPLE 1

(a) A 5 gram sample of silica bonded silicalite adsorbent, 1/16 inch extrudates, was placed in 100 cc of 1 weight percent phenol solution in a glass jar. The glass jar was capped and placed in a shaker bath at room temperature. The silicalite adsorbent was allowed to attain equilibrium with the phenolic water overnight. Following this adsorption step, the adsorbent was removed from the solution and washed with 50 cc. of distilled water for a brief duration to remove excess solution from the macropore structure of the adsorbent. A portion of the adsorbent (~0.5 gram) was analyzed for Carbon content to determine the amount of phenol adsorbed. The adsorbent was found to contain 2.7±0.1 weight percent carbon. Since the fresh silicalite adsorbent has a carbon content value of essentially zero, all of this carbon is due to the adsorption of phenol from water. This corresponds to a phenol loading value of 3.5 weight percent (expressed as grams of phenol adsorbed/100 grams of silicalite adsorbent). The remaining silicalite was placed in a clean glass jar to which 100 cc of 30 percent aqueous $H_2O_2$ solution was added to regenerate the adsorbent. The jar was placed in the shaker bath and the temperature raised to 150° F. In order to assure complete oxidation, the contents of the jar were allowed to attain equilibrium overnight. The jar was then removed from the shaker bath and allowed to cool down. The silicalite adsorbent was removed and a portion of this regenerated adsorbent was analyzed for carbon content following brief washing with distilled water. The carbon content of this sample was found to be 0.05±0.02 weight percent. This indicates that essentially all of the 3.5 weight percent phenol present on silicalite was oxidized and the silicalite material was effectively regenerated using $H_2O_2$.

(b) In order to determine if silicalite was affected by the treatment in $H_2O_2$ solution, another adsorption step was run using the regenerated silicalite of part (a) to measure the loading of phenol on regenerated silicalite. The carbon value following the adsorption step as described above was found to be 3.2 weight percent (i.e. 4.17 weight percent phenol loading) indicating that no damage had been done to the silicalite adsorbent by the $H_2O_2$.

(c) The material of part (b) was regenerated again via oxidation with $H_2O_2$ as previously described. The carbon content of the adsorbent was reduced to near zero again—0.05±0.02 weight percent.

The type of experiments described in this Example 1 were carried out several times with acceptably reproducible results. The regeneration liquids were also found to contain little carbon-organic or inorganic. The carbon values present in the silicalite adsorbent following the adsorption step was therefore "combusted" by the $H_2O_2$ and the toxic organic materials were not present in the regenerate liquid.

EXAMPLE 2

Another class of organic materials that have been found in drinking water supplies with increasing frequency of occurrence are the chloro-organics. As a general class, chloro-organics are highly toxic materials and several are extremely harmful to health. A chloro-organic that is typically found in drinking water is chloroform and was studied in this example. The procedure used in this Example 2 is identical to that used in Example 1 with the exception that a 0.8 weight percent solution of chloroform was used in place of the 1 weight percent solution of phenol that was used in Example 1. The lower concentration of chloroform used was necessitated by the correspondingly lower solubility of this compound in water versus phenol. Furthermore, higher concentrations of the organics were used in both examples than typical values for drinking water in order to facilitate the analytical work. The progress of the experiment was again followed via carbon analyses of the adsorbent samples at various points during the experiment. The results showed that the technique of the present invention—concentration of the organic via adsorption followed by oxidative combustion at mild conditions—worked very well with chloroform as well. A summary of the results is as follows:

| Sample Description | Weight Percent Carbon | Chloroform |
|---|---|---|
| Silicalite after 1st adsorption step | 0.31 ± 0.05 | 3.1 ± 0.5 |
| Silicalite after 2nd adsorption step | 0.46 ± 0.05 | 4.6 ± 0.5 |
| Silicalite after 2nd regeneration step | 0.03 ± 0.01 | 0.3 ± 0.1 |
| Regeneration liquid after 2nd regeneration step | 0.0004 | 0.004 |

EXAMPLE 3

(a) This illustrates the synergism between silicalite and $H_2O_2$ for the oxidation of organics found in potable water by using phenol as a representative compound. The following mixtures were prepared in separate glass jars.

| Mixture No. | Description |
|---|---|
| 1 | 1 cc phenol* + 100 cc of distilled water |

-continued

| Mixture No. | Description |
|---|---|
| II | 1 cc phenol + 100 cc of 30% $H_2O_2$ |
| III | 1 cc phenol + 100 cc of distilled water + 1 grams silicalite |
| IV | 1 cc phenol + 100 cc of 30% $H_2O_2$ + 5 grams of silicalite. |

*91.2 percent phenol

The silicalite adsorbent used was in the form of silica bonded 1/16 inch extrudates. All four mixtures were placed in a shaker bath at 66° C. and allowed to contact overnight. Following this, the liquid from all jars was analyzed for carbon content. The solid adsorbents from mixtures III and IV were also analyzed for carbon. The following results were obtained:

| Mixture No. | Carbon, mg/ml | Phenol, mg/ml |
|---|---|---|
| I | 8.1 | 10.6 |
| II | 7.4 | 9.7 |
| III | 6.0 | 7.8 |
| IV | 1.3 | 1.7 |

Mixture No. I served as the control standard for this experiment. This mixture was made to contain 10.7 mg/ml of phenol in water and following overnight heating in a loosely capped jar, the concentration of phenol was, expectedly, substantially unchanged as evidenced by the value of 10.6 mg/cc. Mixture II shows the oxidation of phenol by $H_2O_2$ at 66° C. in the absence of silicalite. A modest amount of oxidation is evident. The phenol concentration following overnight oxidation was found to be 9.7 mg/ml versus 10.6 mg/ml for the control mixture. A process wherein $H_2O_2$ is used directly to contact the organic in the absence of an adsorbent would, therefore, not be efficient enough to be practical.

The results obtained with mixture No. IV (which consists of Mixture No. II + 5 grams of silicalite) illustrates the synergistic enhancement of the oxidation process of phenol using $H_2O_2$. The phenol concentration following oxidation at 150° F. was reduced to a value of 1.7 mg/ml versus 10.6 mg/ml for the control sample and 9.7 mg/ml for the sample containing 30% $H_2O_2$ without the benefit of silicalite. Some of this decrease can be accounted for by the adsorption of phenol on silicalite. This effect can be quantified by an examination of the results obtained for Mixture No. III versus Mixture No. I. It is clear that the oxidation of phenol by $H_2O_2$ is greatly enhanced by silicalite. There are two likely reasons for this. One is that phenol is concentrated on to the adsorbent and the reaction with $H_2O_2$ is enhanced. The other is that the trace amounts of metals present in silicalite enhanced the oxidation process by facilitating the breakdown of $H_2O_2$ to hydroxyl ions.

(b) The silicalite adsorbent samples from Mixture No. III and IV were analyzed for carbon content as well. The sample from Mixture No. III contained 2.2 wt % carbon versus 0.15 wt % carbon for the sample from Mixture No. IV. Since there is very little carbon (i.e. phenol) left on silicalite and very little phenol left in solution (1.3 mg/ml), it is clear that a substantial portion of the phenol was oxidized effectively by 30% $H_2O_2$ at 66° C. in Mixture No. IV.

It will be understood that whereas the present invention has been described herein above as applying to the purification of relatively dilute aqueous solutions of organic materials, the process is equally applicable to the separation of organic materials from far more concentrated solutions. In the case of bulk separations, however, cost considerations favor the disposal of the organic adsorbate by methods other than reaction with an aqueous oxidizing solution such as employed herein.

What is claimed is:

1. Cyclic process for purifying aqueous media containing dissolved organic impurities which comprises providing a water feedstock containing from about 10 ppb (wt.) to about 20,000 ppm (wt.) of dissolved organic compounds, contacting said feedstock with an adsorptive mass of an organophilic zeolitic molecular sieve, said molecular sieve having pore diameters large enough to adsorb at least some of said organic compounds whereby said organic compounds are adsorbed thereon and a purified water product is obtained, removing the organic compound-laden molecular sieve from contact with the purified water product and simultaneously regenerating said molecular sieve and oxidatively destroying at least a portion of the organic adsorbate thereon by contact with an aqueous solution of a compound having a standard oxidation potential of at least 0.25 volt, and thereafter again contacting the regenerated molecular sieve with additional water feedstock to be purified.

2. Process according to claim 1 wherein the framework $SiO_2/Al_2O_3$ molar ratio of the zeolitic molecular sieve is at least 50.

3. Process according to claim 2 wherein the standard oxidation potential of the compound used to regenerate the molecular sieve is from 0.5 to 2.0 volts.

4. Process according to claim 3 wherein the compound used to regenerate the molecular sieve is hydrogen peroxide.

5. Process according to claim 4 wherein the hydrogen peroxide is in the form of an aqueous solution containing from 20 to 40 weight percent hydrogen peroxide.

6. Process according to claim 1 wherein the zeolitic molecular sieve is a silica polymorph.

7. Process according to claim 6 wherein the silica polymorph is a member of the group consisting of silicalite, F-silicalite and TEA-silicate.

8. Process according to claim 7 wherein the silica polymorph is silicalite.

* * * * *